L. P. OSWALT.
COMBINED FERTILIZER DISTRIBUTER AND COTTON SEED PLANTER.
APPLICATION FILED AUG. 29, 1911.
1,023,752.
Patented Apr. 16, 1912.
2 SHEETS—SHEET 1.
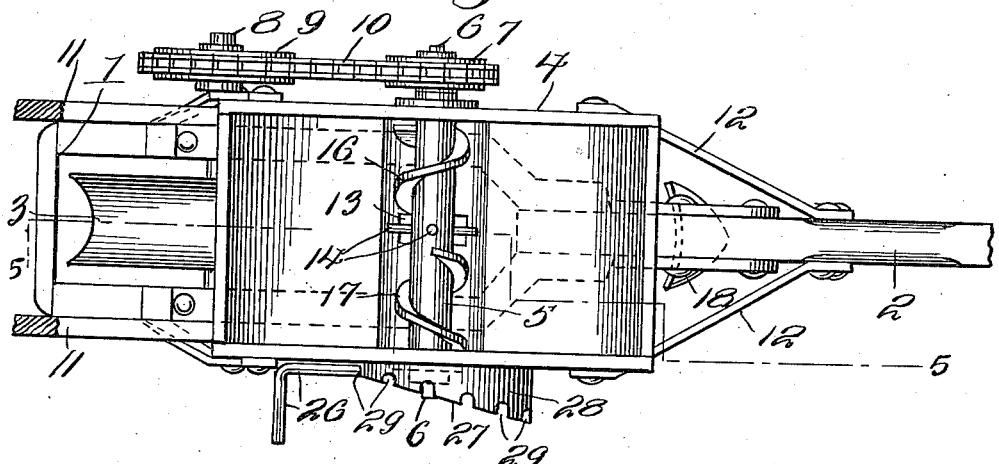
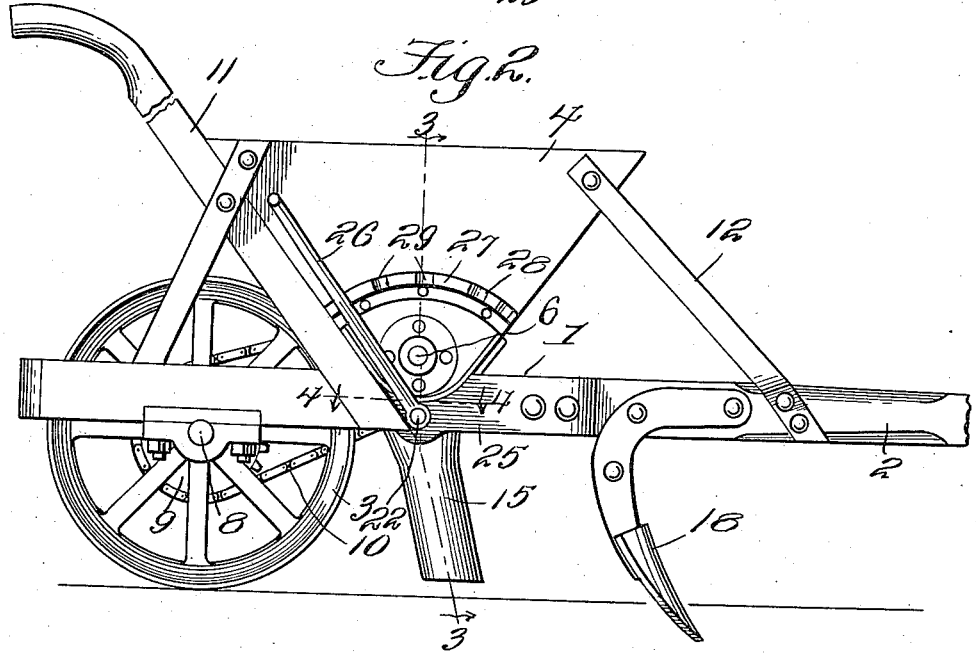
Witnesses
Inventor
Lorenza P. Oswalt,
By Victor J. Evans
Attorney L. P. OSWALT.
COMBINED FERTILIZER DISTRIBUTER AND COTTON SEED PLANTER.
APPLICATION FILED AUG. 29, 1911.
1,023,752.
Patented Apr. 16, 1912.
2 SHEETS—SHEET 2.
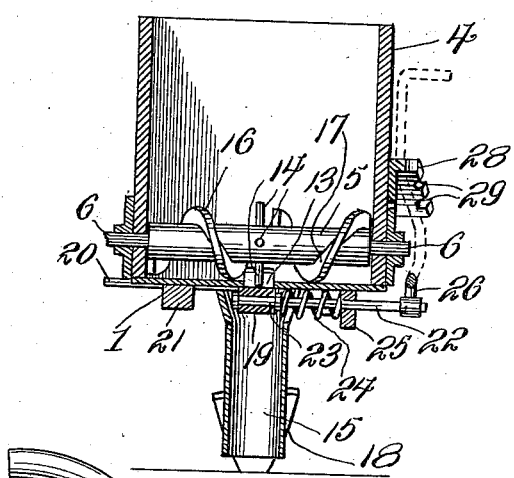
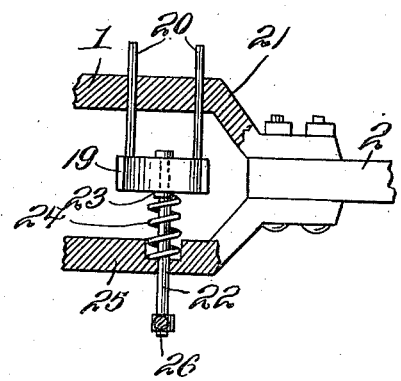
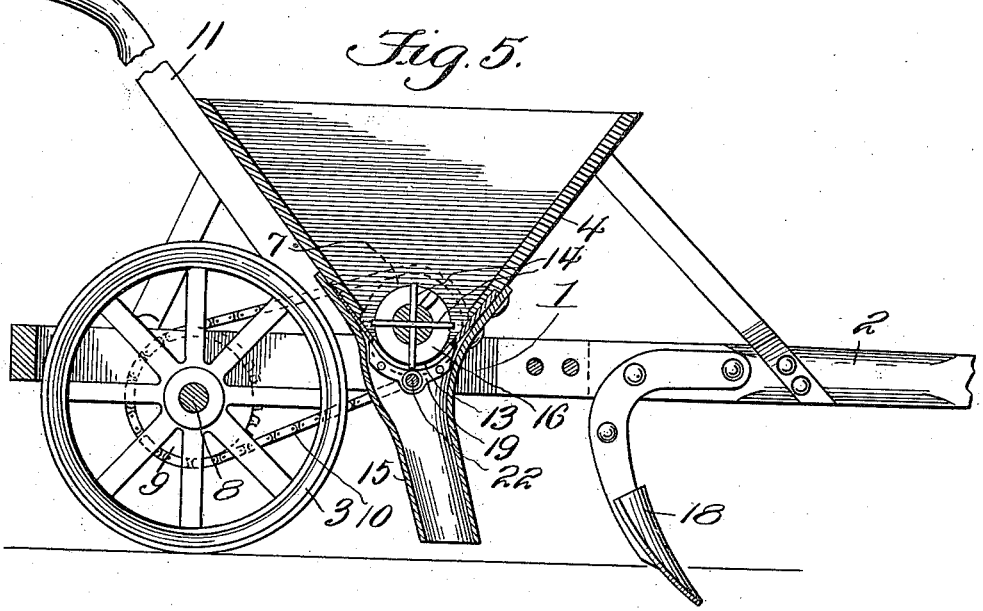
Witnesses
J. T. L. Wright
Inventor
Lorenza P. Oswalt,
By Victor J. Evans
Attorney

UNITED STATES PATENT OFFICE.

LORENZA P. OSWALT, OF BRADLEY, MISSISSIPPI.

COMBINED FERTILIZER-DISTRIBUTER AND COTTON-SEED PLANTER.

1,023,752.  Specification of Letters Patent.  Patented Apr. 16, 1912.

Application filed August 29, 1911. Serial No. 646,563.

*To all whom it may concern:*

Be it known that I, LORENZA P. OSWALT, a citizen of the United States, residing at Bradley, in the county of Oktibbeha and State of Mississippi, have invented new and useful Improvements in Combined Fertilizer-Distributers and Cotton-Seed Planters, of which the following is a specification.

This invention relates to a combined fertilizer distributer and cotton seed planter, the object of the invention being to provide a feeding mechanism which will include an agitator and means for feeding the seed or the fertilizer in the direction of the agitator.

Another object of the invention is to provide a regulator for controlling the discharge of the fertilizer or seed from the hopper, the said regulator including means whereby it can be readily and effectively held in the required adjusted position.

In the drawings, forming a portion of this specification and in which like numerals of reference indicate similar parts in the several views: Figure 1 is a top plan view of the combined distributer and seed planter. Fig. 2 is a side view thereof. Fig. 3 is a horizontal section on line 3—3 of Fig. 2. Fig. 4 is a horizontal section on line 4—4 of Fig. 2. Fig. 5 is a section taken on line 5—5 of Fig. 1.

The distributer and planter comprises a frame 1 which is provided with a forwardly extending draft pole or tongue 2 and a rear covering and supporting wheel 3. Forwardly of the supporting wheel, and suitably mounted upon the frame 1 is a hopper 4 and extending horizontally through the bottom of the hopper is a feeding member 5. This member is provided with end trunnions or stub shaft portions 6 which are journaled in the sides of the hopper, one of said trunnions being extended beyond the side of the hopper and having secured thereto a sprocket gear wheel 7. The shaft 8 of the supporting wheel 3 is provided with a sprocket gear wheel 9 which is connected with the gear wheel 7 by the driving chain 10. The gear wheel 9 is somewhat larger than the wheel 7 so that the feeder can be revolved with the required rapidity to effect a perfect displacement of the seed or the fertilizer from the hopper. Rearwardly of the hopper and extending upwardly and secured to the frame 1 are handles 11 which may be of any suitable well known construction. Forwardly extending brace members 12 are illustrated herein as connecting the hopper with the draft pole 2.

At the center, the hopper is provided with a discharge opening 13. The feeding member 5 is located above the discharge opening 13, and at the center, the member is provided with combined agitating and discharge fingers or pins 14. These pins are arranged radially of the feeding member and are adapted to extend slightly through the discharge opening 13 on rotation of the feeding member so as to cause an accurate and effective discharge of the seed or the fertilizer into the conveying shoe 15. This shoe is secured to the underside of the hopper and extends downwardly and forwardly therefrom. The feeding member is provided with conveying portions 16 and 17, the said portions being preferably in the form of right and left hand screws, and as illustrated, the innermost convolution of each screw portion terminates at one side of the agitating fingers 14. This construction is such that the material in the hopper will be taken up by the feeding member and carried in the direction of the discharge opening 13 and the agitating fingers 14.

A suitable plow shovel 18 is secured to the draft pole 2 and is located in advance of the shoe 15 so that the required furrow can be formed into which the cotton seed can be conducted when the machine is propelled. The supporting wheel 3 of the machine is located immediately in line with the shoe 15 and in effect is a coverer to cover the seed in the furrow as will be understood.

A regulator or valve 19 is slidable horizontally beneath the hopper and is adapted for movement beneath the discharge opening 13 so that the latter can be covered or uncovered at the will of the operator to regulate the discharge of the material. The member 19 is provided with a pair of guide arms 20 which are slidable in one of the side bars 21 of the frame 1. A shaft 22 is slidable in the frame, and as shown, said shaft is swiveled, at 23, to the member 19. A spring 24 surrounds the shaft and is disposed between the member 19 and the frame 1. This spring exerts its tension to hold the valve normally closed. The outer end of the shaft 22 is provided with a regulating or controlling lever 26. This lever extends upwardly and outwardly at an angle from the side of the hopper 4 and is movable across the locking surface 27 of the arcuate rack member 28. This member is secured to the side of the hopper and is provided with notches 29 into which the lever can be interchangeably seated so as to hold the member 19 in the desired adjusted position. The member 28 is of an increased thickness from one end to the other so that the effective locking surface of the member is disposed at an angle with respect to the vertical side of the hopper. The member 28 is substantially of cam configuration.

I claim:

1. A combined fertilizer distributer and seed planter comprising a hopper having a discharge opening therein, means for discharging the material from the opening, a sliding regulator mounted beneath the opening and including a member slidably connected with the supporting frame of the hopper, and means for holding the member against movement.

2. A hopper, a supporting frame therefor, a regulating member located beneath the discharge opening of the hopper, the supporting frame of the hopper including spaced side bars, parallel rods carried by the regulating member and slidable in one of the parallel bars of the supporting frame, and a slidable shaft carried by the regulating member and operatively adjustable in the opposite parallel bar of the supporting frame.

In testimony whereof I affix my signature in presence of two witnesses.

LORENZA P. OSWALT.

Witnesses:
A. D. SIKES,
J. D. TOMLINSON.

---

Copies of this patent may be obtained for five cents each, by addressing the "Commissioner of Patents, Washington, D. C."